United States Patent [19]

De Bliquy

[11] 4,131,380
[45] Dec. 26, 1978

[54] SHAFT END COUPLING MEANS

[76] Inventor: Michael C. De Bliquy, P.O. Box 69732, Bryanston 2021, South Africa

[21] Appl. No.: 821,488

[22] Filed: Aug. 3, 1977

[51] Int. Cl.$^2$ .............................................. F16D 1/00
[52] U.S. Cl. ...................................... 403/217; 52/81; 52/648; 403/406; 135/15 PQ; 135/DIG. 9
[58] Field of Search ................. 48/171, 172, 176, 217, 48/190, 258, 403, 407; 52/80, 81, 648; 46/29

[56] References Cited

U.S. PATENT DOCUMENTS

| | | | |
|---|---|---|---|
| 3,563,580 | 2/1971 | Black | 52/648 X |
| 3,632,147 | 1/1972 | Finger | 403/217 X |
| 3,722,153 | 3/1973 | Baer | 403/176 UX |
| 3,789,562 | 2/1974 | Chicchis et al. | 403/176 UX |
| 3,844,074 | 10/1974 | Ahern | 52/81 |
| 3,864,049 | 2/1975 | Ono | 403/217 X |
| 3,921,360 | 11/1975 | Baldwin | 403/176 X |
| 4,027,449 | 6/1977 | Cilveti | 403/176 X |

FOREIGN PATENT DOCUMENTS

| | | | |
|---|---|---|---|
| 2111532 | 9/1971 | Fed. Rep. of Germany | 403/217 |
| 213713 | 1941 | Switzerland | 403/217 |

Primary Examiner—Wayne L. Shedd

[57] ABSTRACT

Coupling means for use in erecting a framework structure, which includes a node having on its outer surface a plurality of primary faces disposed in a predetermined arrangement and secondary faces associated with the primary faces, each secondary face being arranged to occupy the same position relative to a primary face as other secondary faces occupy relative to their associated primary faces; and at least one retaining member having holding means for holding it on a primary face of the node, the retaining member having at least one ear locatable on a secondary face associated with the primary face on which the retaining member is locatable, the ear having a locating formation to permit location of the end of a cross member or a connector for a cross member in a load supporting position against a secondary face of the node.

10 Claims, 4 Drawing Figures

SHAFT END COUPLING MEANS

This invention relates to coupling means for use in framework structures, particularly space frames. It relates also to framework structures incorporating the coupling means.

According to the invention there is provided coupling means for use in erecting a framework structure, which includes a node having on its outer surface a plurality of primary faces disposed in a predetermined arrangement and secondary faces associated with the primary faces, each secondary face being arranged to occupy the same position relative to a primary face as other secondary faces occupy relative to their associated primary faces; and at least one retaining member having holding means for holding it on a primary face of the node, the retaining member having at least one ear locatable on a secondary face associated with the primary face on which the retaining member is locatable, the ear having a locating formation to permit location of the end of a cross member or a connector for a cross member in a load supporting position against a secondary face of the node.

The node may have a plurality of secondary faces associated with each primary face and arranged symmetrically relative to each primary face. The retaining member may then have a plurality of ears arranged symmetrically thereon and corresponding to the symmetrical secondary faces of the node.

The retaining member may be in the form of a shaped plate, preferably having a flat face corresponding to the primary face and flat ears bent at an angle relative to the flat face. If desired gripping formations may be provided on the retaining member for minimising relative movement between the node and the retaining member.

The primary faces may have tapped holes therein. The holding means may then include a screw threaded member, e.g., a bolt, adapted to hold the retaining member on the primary face. Alternatively, a screw threaded stud may be provided projecting outwardly from each primary face. A nut may then co-operate with the stud to hold the retaining member on the primary face.

The locating formation in each ear of the retaining member may be in the form of an aperture defined in each ear and adapted to receive the end of a cross member or a connector for the cross member. A countersunk formation may then be provided at one end of the aperture closest to the node.

The invention extends further to a framework structure which includes a plurality of coupling means as above described, connectors mounted on the retaining members, and cross members attached to the connectors and interconnecting the coupling means.

When the retaining members have countersunk formations, the connectors may be mounted on the retaining members by countersunk screws fitting snugly in the countersunk formation of each aperture of the ears of the retaining members. The head of each countersunk screw is conveniently flush with the inner face of each ear.

The cross members may be attached to the connectors by crimping. Each connector may be in the form of a tubular member having a tapped hole at one end to receive the countersunk screw. Its other end fits male-female fashion in the hollow end of the cross member. Mating locating formations, e.g., in the form of circumferential grooves, may then be formed on the connectors and on the ends of the cross members so that the connectors and cross members are positively located relative to each other.

An embodiment of the invention is now described by way of example with reference to the accompanying drawings, in which.

Figure 1:
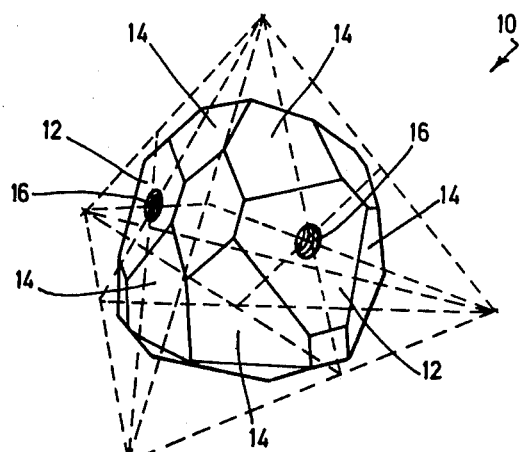
FIG. 1 shows a three-dimensional view of a node of the coupling means in accordance with the invention.

Referring to FIG. 1, reference numeral 10 generally indicates a node having on its outer surface in this embodiment, four equally spaced primary faces 12. In the embodiment illustrated, the faces 12 are arranged on the walls of an imaginary triangular based pyramid indicated in dotted lines. Various other arrangements of the primary faces 12 on the node 10 are possible but preferably, the faces are arranged on the walls of a polygonal based pyramid.

Also in the embodiment illustrated, three secondary faces 14 are arranged symmetrically around each primary face 12. Again, the arrangement of the secondary faces relative to the primary faces can vary dependent upon the types of structure to be built.

Other faces are provided on the node 10 but these have no significance and are merely arranged in a regular configuration so as to lend a neat appearance to the node.

Each primary face 12 has a tapped hole 16 for receiving a bolt 18 which holds a retaining member 20 on a primary face.

Figure 4:
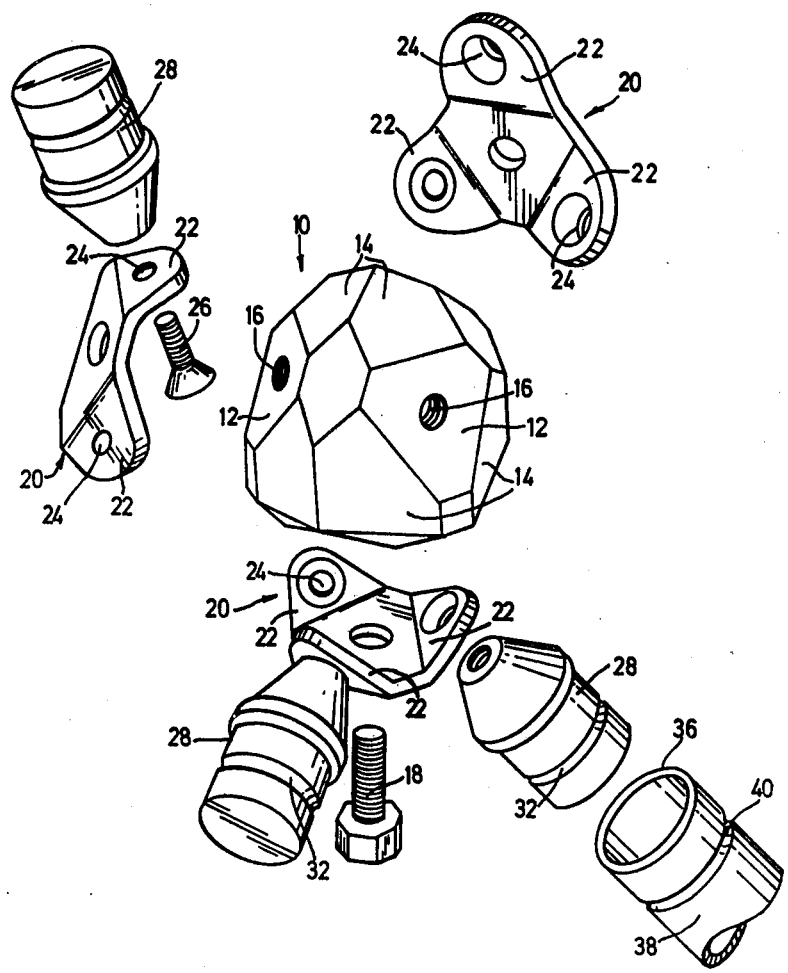
FIG. 4 shows an exploded three-dimensional view of the coupling means.

As shown particularly in FIG. 4, the retaining plate 20 has three ears 22 which are bent to seat against the secondary faces 14 of the node. Each ear 22 has an aperture 24 which is countersunk on the side closest to the node.

Figure 2:
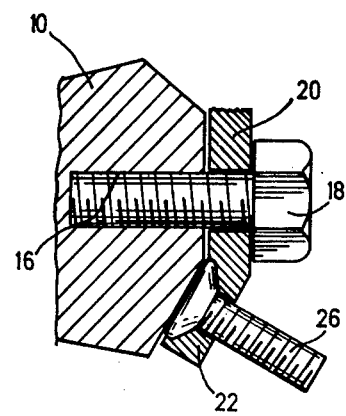
FIG. 2 shows a section through portion of the coupling means of the invention.

As shown in FIG. 2, a countersunk screw 26 is located in the countersunk hole 24 to permit attachment of a connector member 28.

Figure 3:
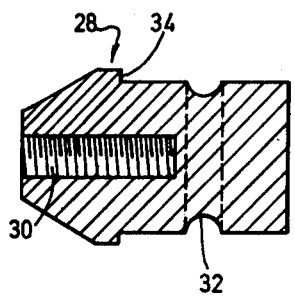
FIG. 3 shows an axial section through a connector for the coupling means.

As shown in FIG. 3, the connector 28 has a tapped hole 30 in its one end and a circumferential groove 32 near its other end. A shoulder 34 in use abuts against the end 36 of a cross member 38 (see FIG. 4) and the end of the cross member is crimped so that it is positively located by a groove 40 in the groove 32 of the connector 28.

In use, the connectors 28 are fitted onto the ears 22 of the retaining plates 20 by means of the countersunk screws 26. The retaining plates 20 are then bolted onto the node with the ears of the retaining plate in abutting relationship with the secondary faces 14 of the node.

Cross members 38 are then fitted to the connectors 28 by crimping or other suitable means. Dependent upon the type of structure to be built, one or more of the primary faces will have retaining plates and connectors fitted thereto.

The invention provides a relatively simple and quick method of assembling framework structures of varying sizes and which can be used in various fields. In view of the abutting relationship between the cross members and the secondary faces of the node via the connectors 28, a strong structure can be obtained. The coupling means can be used to erect large structures such as domes, roofs, and so on in a variety of space frame configurations.

The coupling means can be made of lightweight material, e.g., aluminium, and because of the particular configuration of the node, lighter materials can be used for the cross members compared with existing systems. It is believed that structures such as roof and deck support systems can be erected in a short time with relatively unskilled labour. The components can be easily transported to and assembled on site. When in the form of an equilateral tetrahedron system, the structure becomes geodesic thus permitting a uniform distribution of forces and thereby a lightening of the component parts.

I claim:

1. Coupling means for use in erecting a framework structure, which includes a node having on its outer surface a plurality of primary faces disposed in a predetermined arrangement and secondary faces associated with the primary faces, each secondary face being arranged to occupy the same position relative to a primary face as other secondary faces occupy relative to their associated primary faces; and at least one retaining member having holding means for holding it on a primary face of the node, the retaining member having at least one ear locatable on a secondary face associated with the primary face on which the retaining member is locatable, the ear having a locating formation to permit location of the end of a cross member or a connector for a cross member in a load supporting position against a secondary face of the node.

2. Coupling means as claimed in claim 1, in which the node has a plurality of secondary faces associated with each primary face and arranged symmetrically relative to each primary face.

3. Coupling means as claimed in claim 2, in which the retaining member has a plurality of ears arranged symmetrically thereon and corresponding to the symmetrical secondary faces of the node.

4. Coupling means as claimed in claim 1, in which the retaining member is in the form of a shaped plate.

5. Coupling means as claimed in claim 1, in which the primary faces have tapped holes and the holding means includes a screw threaded member adapted to hold the retaining member on the primary face.

6. Coupling means as claimed in claim 1, in which the locating formation in each ear of the retaining member is in the form of an aperture defined in each ear and adapted to receive the end of a cross member or a connector for the cross member.

7. Coupling means as claimed in claim 6, in which a countersunk formation is provided at one end of the aperture closest to the node.

8. A framework structure comprising:
a plurality of coupling means, each said coupling means including a node having on its outer surface a plurality of primary faces disposed in a predetermined arrangement and secondary faces associated with respective ones of said primary faces, each said secondary face being arranged to occupy the same position relative to a primary face as other secondary faces occupy relative to their associated primary faces;
at least one retaining member on each said coupling means and holding means for holding said retaining members on respective primary faces of the node, each said retaining member having at least one ear locatable on a secondary face associated with the primary face on which the retaining member is locatable, each such ear having a locating formation configured and dimensioned to permit location of a connector for a cross member in a load supporting position against the secondary face underlying said ear;
and a plurality of cross members attached to the connectors of different coupling means interconnecting the coupling means.

9. A framework structure as claimed in claim 8, in which the locating formation in each ear of each retaining member is in the form of an aperture which is countersunk on the side of the ear closest to the node, and in which the connectors are mounted on the retaining members by countersunk screws fitting snugly in the countersunk formation of each aperture of the ears of the retaining members.

10. A framework structure as claimed in claim 8, in which the cross members are attached to the connectors by crimping.

* * * * *